Sept. 28, 1965   W. E. GLENN, JR   3,209,072
LIGHT PROJECTION ELECTRON BEAM WRITING SYSTEM
Filed June 26, 1961   3 Sheets-Sheet 1

Inventor:
William E. Glenn Jr.,
by Richard R. Brainard
His Attorney.

Fig. 10.

United States Patent Office 3,209,072
Patented Sept. 28, 1965

3,209,072
LIGHT PROJECTION ELECTRON BEAM
WRITING SYSTEM
William E. Glenn, Jr., Scotia, N.Y., assignor to General
Electric Company, a corporation of New York
Filed June 26, 1961, Ser. No. 119,712
11 Claims. (Cl. 178—5.4)

The present invention relates to an improved light projection system and more particularly to an improved electron beam writing and optical system for providing an optical output corresponding to the information contained in orthogonally arranged diffraction patterns of a light modulating medium produced by the electron beam writing system.

In my Patent 2,813,146 dated November 12, 1957, is described and claimed a system particularly suited for projecting a color image corresponding to the information contained in simultaneously formed diffraction patterns each corresponding to one color component of an input, for example, the electrical signals corresponding to a color television picture. In my copending applications Serial No. 799,295, now Patent 3,078,338 filed March 13, 1959 (a continuation-in-part of my application Serial No. 782,955, filed December 24, 1958), now abandoned, and Serial No. 835, 208, filed August 20, 1959, now Patent No. 3,118,969, there are disclosed and claimed light modulating and projection systems in which a part of the information is presented on a light modulating medium in the form of diffraction patterns established therein and extending in one direction and the remainder of the information is contained in diffraction patterns established in the light modulating medium and extending in a direction orthogonal thereto. As pointed out in these applications such a system has certain advantages with respect to requirements imposed upon the projection system, the resolution obtained, and the lack of interference between the information contained in the two sets of patterns as compared to the system of the patent in which all of the diffraction patterns, as specifically disclosed therein, extend in the same direction.

The present invention is directed to a projection system of the latter type, i.e., one employing orthogonal diffraction patterns, in which the optical system provides for uniform illumination of the raster or rectangular area of the medium from which the information is being projected and more efficiently employs the total light from the light source. The optical system is also particularly well suited for use in a projector in which the light paths are concentric with and surround the electron beam generating apparatus. A light valve system of this latter type in which the light path surrounds the electron beam generator and lies within the electron beam control electrodes is described and claimed in Schaffermidt et al. application Serial No. 151,360, filed November 9, 1961, and having a convention date of November 15, 1960, based on an application filed in Germany on that date. Accordingly, it is an important object of the present invention to provide an improved optical projection system which incorporates the above features and advantages.

In the illustrated embodiment of the invention a light modulating medium in the form of an oil film is supported on an inner end wall of an evacuated chamber which provides a housing for the electrodes for producing and controlling the electron beam to produce orthogonally arranged diffraction gratings, one of which contains the color information corresponding to one color component of the scene to be projected and the other grating of which includes the color information of the remaining two colors of the scene to be projected. The projection optics are arranged concentrically with the electron beam forming and control apparatus and include a projection lamp supported at one focus of an elliptical mirror or reflector, the other focus of which lies on the plane of the modulating medium. Light from the projection lamp is reflected by the mirror onto one surface of a generally rectangular array comprising two sets of lenticular lenses orthogonally arranged with each set of lenticular lenses serving to image the light source on a corresponding and similarly extending longitudinally spaced array of lenticular lenses associated with a cooperating bar and slit system. These two bar and slit systems provide the input masks of a schlieren optical system. The orthogonally arranged lenticular lenses associated with the orthogonally arranged bar and slit systems serve to image respectively each of the lenticular lenses of the first composite lens system on the raster area of the modulating medium so that the image of each bar fills the full raster in one direction, i.e., the direction transverse to the length of the lens. In the direction of the light travel the remainder of the projection system includes, starting with the modulating medium, a condensing or schlieren lens, a projection lens and a pair of filter masks. Each filter mask includes a plurality of parallel spaced filter strips which are spaced from one another transversely in accordance with the spacing of the corresponding orthogonally arranged slits of the input masks and the filter strips which pass light corresponding to the color of the filter strip. In a particular embodiment the filter strips extending in a vertical direction are green and those in a horizontal direction are magenta. Light impinging upon the crossovers or projected common areas of these orthogonal filter strips is blocked or prevented from reaching the image plane or screen. When the light modulating medium is undeformed, the light proceeds in an undeviated undefracted manner and is blocked by these common or overlying areas. As will be described in more detail, when the medium contains deformations corresponding to either or both of the colors controlled by the respective filter strips, diffraction takes place along the corresponding filter strip to the area of the filter strip which does not overlie the filter strip of the other color or through the openings between the strips when both color components are present and corresponding light is projected to the image screen. A system using orthogonally arranged filter strips in connection with a light modulating medium for projection of color information, for example, is described and broadly claimed in my copending application Serial No. 49,746, filed August 15, 1960, entitled "Colored Light Projection System" and assigned to the assignee of this invention.

In accordance with another important aspect of the illustrated embodiment of my invention, the electron beam is focused and controlled by an electrode system arranged concentrically with the light projection path and sufficiently open or widely spaced to permit the light projection path to lie within the beam controlling electrodes. Specifically, the beam is focused and deflected by two sets of cylindrical electrostatic lenses which are crossed, i.e., the two pairs of electrodes of one set extend transversely to the electron beam path and orthogonally with respect to the other set which also extend transversely to the beam path. These electrodes are suitable for both focusing and deflection and one set of each of the orthogonally extending electrodes are utilized for focusing the beam and both sets are used for deflection. These crossed cylindrical lenses, as contrasted with axially symmetrical lenses, permit this simultaneous focusing and deflection function and also result in a shorter lens and deflection structure and consequently more demagnification of the spot for a given deflection angle. Also, in the electron beam system disclosed more resolution is needed in one direction than in the other. This is conveniently provided by the greater demagnification in one direction, i.e., in the direction of one set of the electrodes. In addition, the spherical aberration of the electron lens occurs in rectangular form rather than in polar form. This reduces the interaction between the color information of the orthogonal deformations of the modulating medium. As compared with the prior art magnetic deflection, electric static elements are smaller and easier to drive with the deflection and dynamic focus voltages.

Accordingly, further important objects of the present invention are to provide an improved focus and deflection and electrode system for the electron beam and particularly one which is suited for writing of information on a modulating medium and providing a coaxial light projection path.

My invention, together with further objects and advantages thereof, will be better understood by reference to the following detailed description of a preferred embodiment thereof, reference being had to the accompanying drawing and its scope will be pointed out in the appended claims. In the drawing:

Figures 1, 2, 3, 4, 5, 6, 7:
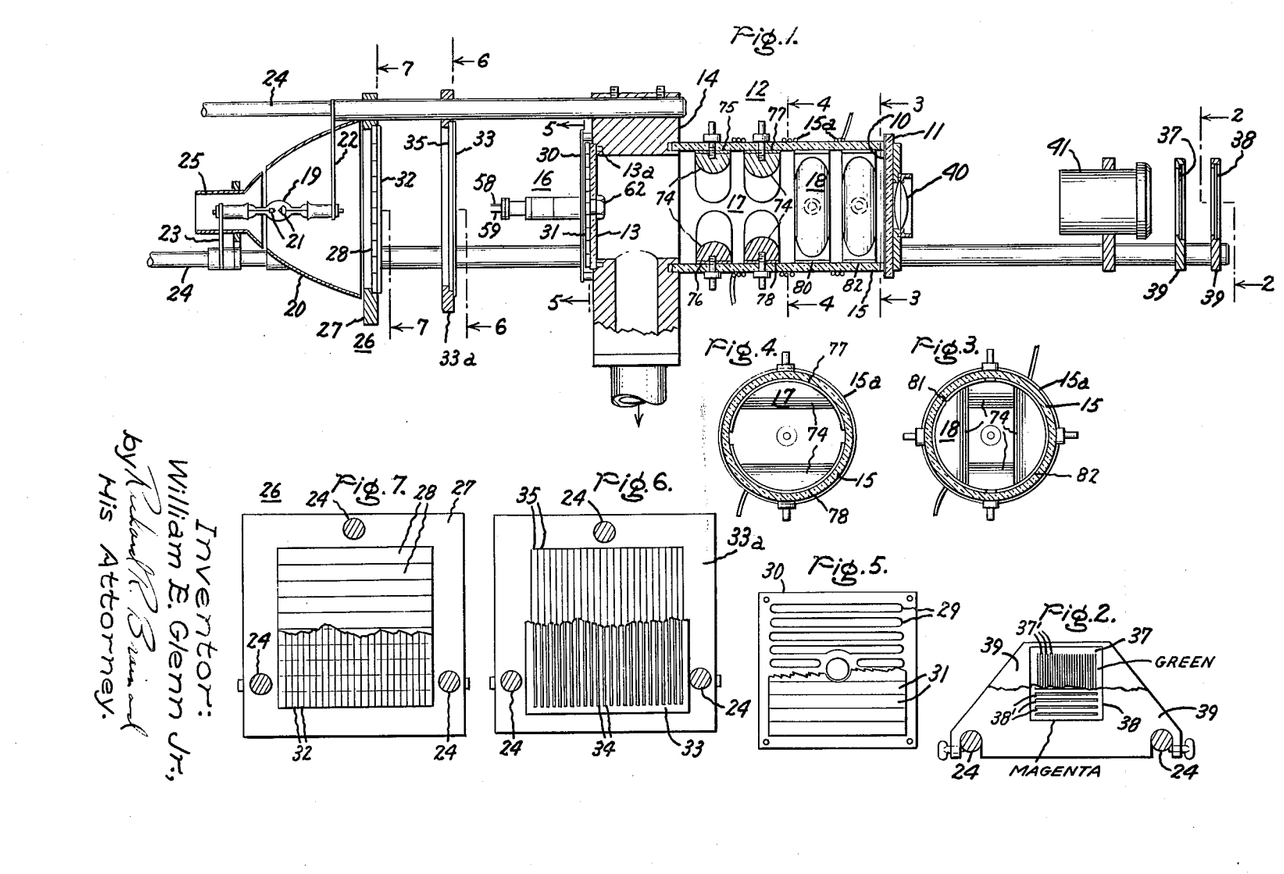
FIG. 1 is an elevational view in sections of electron beam writing and optical projection apparatus embodying my invention.
FIG. 2 is a view taken along the line 2—2 of FIG. 1 showing the orthogonally arranged color filter strips.
FIG. 3 is a view taken along the line 3—3 of FIG. 1 showing the horizontal deflection apparatus.
FIG. 4 is a sectional view taken along the line 4—4 of FIG. 1 illustrating the vertical deflection apparatus.
FIG. 5 is a view taken along the line 5—5 of FIG. 1 showing the horizontal input mask and associated lenticular lenses.
FIG. 6 is a view taken along the line 6—6 of FIG. 1 showing the vertical input mask and associated lenticular lens system.
FIG. 7 is a view taken along the line 7—7 of FIG. 1 showing the orthogonal lenticular lens system associated with the light source and reflector.

Referring now to the drawing, my invention has been illustrated in a preferred embodiment in which the electron beam forming and controlling apparatus for writing the diffraction patterns on the modulating medium is contained within an evacuated enclosure having transparent end walls and providing an optical projection path concentric with the electron beam and passing through the interior of the vacuum enclosure. In describing the illustrated embodiment, the drawing will be assumed to be oriented with the long side horizontal since in this way the bar and slit systems and filter masks will extend in the same horizontal and vertical directions as the horizontal and vertical deflections, respectively, when the system is used, for example, for reproducing color television pictures. It will be understood that the projector is actually operated in a vertically extending position and that FIG. 1 is actually a side view. As illustrated in the drawing, the light modulating medium 10 is in the form of a thin film of a suitable liquid such as a diphenyl silicon oil spread in a thin layer on the inner surface of a glass end plate 11 of an elongated cylindrical vacuum enclosure 12. The end plate 11 has been rendered conductive on its inner surface in any suitable way such as treatment with stannous chloride, for example, in a manner well understood in the art. The opposite end of the evacuated enclosure 12 is provided by a transparent, preferably glass, end plate 13 sealed against a hollow annular body of metal 14 by engagement with a sealing ring or gasket 13a. The enclosure 12 is completed by an elongated glass cylinder 15 sealed to the member 14 and end plate 11. The end plate 13 provides a support at its center for an electron gun assembly 16 which will be described in more detail at a later point in the specification. The beam generated by the electron gun and accelerated toward the light modulating medium 10 passes between two sets of generally cylindrical focusing and deflection electrode assemblies 17 and 18 supported in spaced relation along the beam path from the cylindrical housing member 15. The electrode assembly 17 provides for the vertical deflection and focus while the electrode assembly 18 provides for the horizontal deflection and focus of the electron beam. These deflections, as will be described at a later point in the specification, are, in a specific embodiment, controlled to establish diffraction patterns in the modulating medium extending at right angles with respect to one another with the deformations corresponding to the green color information causing diffraction or deflection of the light beam in a vertical direction and the deformations corresponding to the remaining light or magenta causing diffraction in a horizontal direction. The system for forming the deformations containing the color information in the modulating medium will be described at a later point in the specification and may be, for example, similar to that shown in FIG. 4 of my aforementioned application Serial No. 835,208, filed August 20, 1959. If the electrons in their travel from the electron gun 16 toward the modulating medium 10 are subjected to magnetic fields, it will cause movement of the electrons in addition to that produced by the deflection and focus electrodes 17 and 18. This may be prevented by magnetically shielding the electron beam path or as illustrated, a coil 15a surrounding the beam path may be provided to produce a compensating magnetic field. This illustrated embodiment has the advantage of permitting a rotational correction of the beam to be made by subjecting it to a predetermined axial magnetic field.

As indicated earlier, it is an important object of the present invention to provide an improved optical system for projecting the information contained in a modulating medium such as the medium 10, particularly with respect to uniformity of the illumination of the area of the medium from which the information is being projected, i.e., the raster, and also with respect to the efficient utilization of the light of the light source. In accomplishing these objectives the preferred embodiment of the system illustrated includes a light source which is imaged on the light modulating medium in the absence of the intervening optics and the light then controlled by two sets of orthogonally arranged source cylindrical lenticular lenses which are effective to focus the light source in the slots of an input masking system and associated mask cylindrical lenticular lenses which are effective to image the source cylindrical lenticular lenses on the raster area so that all of the light passes through the slits of the input masking system except that intercepted by the bars of the orthogonally extending mask, and all of the light is uniformly distributed over the raster area and only the raster area of the modulating medium.

Referring now to FIG. 1, the light source and means for imaging it by converging light rays is provided by the projection lamp 19 which is supported in axial alignment with the electron beam path within and on one focus of an ellipsoidal reflector 20 which in the absence of intervening optics is effective to focus the arc by converging light rays on the light modulating medium 10. In other words, the second focus of the ellipsoidal reflector is at the modulating medium 10. The lamp which may be a commercially available mercury xenon arc lamp with suitable arc defining electrodes 21 supported at the first focus of the ellipsoidal reflector 20 by means of a radially extending arm 22 which also electrically connects one terminal of the lamp to the reflector and by a support and lead-in conductor 23 which supports the other end of the lamp in insulated relation with respect to one of the supporting rods 24 of the projector assembly. If desired, a generally cylindrical duct 25 may be provided at the lower end of the reflector for directing cooling fluid over the arc lamp 19.

The arc lamp and ellipsoidal reflector may be considered as a light source and converging lens system for imaging the arc on the modulating medium and it will be understood that other light sources and optical systems may be employed for this purpose. The light from the reflector 20 illuminates the two orthogonally arranged sets of source cylindrical lenticular lenses designated generally by the numeral 26 and shown in detail in FIG. 7. The orthogonally arranged sets of these lenses are adhered together by transparent cement at their mating surfaces and the two sets secured in a supporting frame 27 which is supported from the supporting rods 24. The horizontal source cylindrical lenticular lenses 28 are illustrated as ten in number. The width of these individual lenses and as a consequence their number is determined in part by the diffraction angle in the modulating medium which is in turn determined by the spacing between adjacent ridges in the medium and the distance from the modulating medium to the plane of the lenses 28. The lenses 28 correspond in number to the number of slots 29 provided in the horizontal input mask 30. On the side of the mask 30 away from the modulating medium 10 are a corresponding number of mask cylindrical lenticular lenses 31. The lenses 28 image the light source in the slots 29 and the lenses 31 image the source lenses 28 on the raster so that each lens 28 occupies the full vertical dimension of the raster. The vertically extending source lenses 32 are, as shown, greater in number than the number of horizontal lenses 28, there being 24. The corresponding input mask 33 is supported from a frame 33a and this mask has an equal number, namely 24, input slots 34. There is a corresponding number of vertically extending cylindrical lenticular lenses 35 overlying the slots 34. As in the case of the horizontal system of lenses and slots, the lenses 32 image the light source in the slots 34 and the mask lenses 35 image the lenses 32 on the modulating medium so that each vertical input source lens 32 is imaged on the full horizontal dimension of the raster area. In this way, all of the light from the source is focused in the horizontal and vertical slots 30 and 34, respectively, and all of the light (except that intercepted by the horizontal bars of mask 30) passes through the modulating medium 10 and is uniformly distributed over the total raster area.

The output portion of the projector includes the output filter masks 37 and 38 each of which includes a support 39 carried by two of the supporting rods 24 and each including a number of filter strips 37' and 38' corresponding to the color information to be contained in the diffraction patterns extending in one of the orthogonal directions in which the diffraction pattern extends. These strips are separated by transparent strips which is readily accomplished if the filters are stamped from suitable squares of filter material and the supports 39 are of glass or other transparent material. Since the color filters of one color, such as green, for example, are opaque to magenta, they provide the bars on which the zero order or undeviated magenta light impinges. Accordingly, they extend in a vertical direction and have a dimension and spacing consistent with the distance between the magenta diffraction gratings in the modulating medium and the input slots 34, since they block the zero order or undiffracted light. Schlieren lens 40 and a projection lens 41 may be the ordinary projection lens of a slide projector. In a similar manner the magenta filter strips are opaque to green and therefore provide bars for the zero order green light and have a width determined by the width of input slots 29. The number of green and magenta bars correspond respectively to the number of vertical and horizontal slots in the masks 33 and 29. The functional relationship of the optical and beam controlling elements of the system are illustrated in the exploded isometric view of FIG. 8 and in which corresponding parts have been designated by the same reference numerals. As indicated in that figure, the output light transmitted by the filters 37 and 38 impinges on an inclined mirror 42 and is reflected onto a viewing screen 43.

The dimensions and spacings of the green and magenta filter strips are related to the distances between the corresponding deformations of the medium, the distance from the medium to the filter and the optics of the system including schlieren lens 40 and projection lens 42. Before considering these dimensions in detail, it is believed well to describe briefly the electron beam writing system and the resulting diffraction patterns that may be provided on the modulating medium 10, since the dimensions of the diffraction gratings are significant parameters in determining these dimensions.

Figures 8, 9:
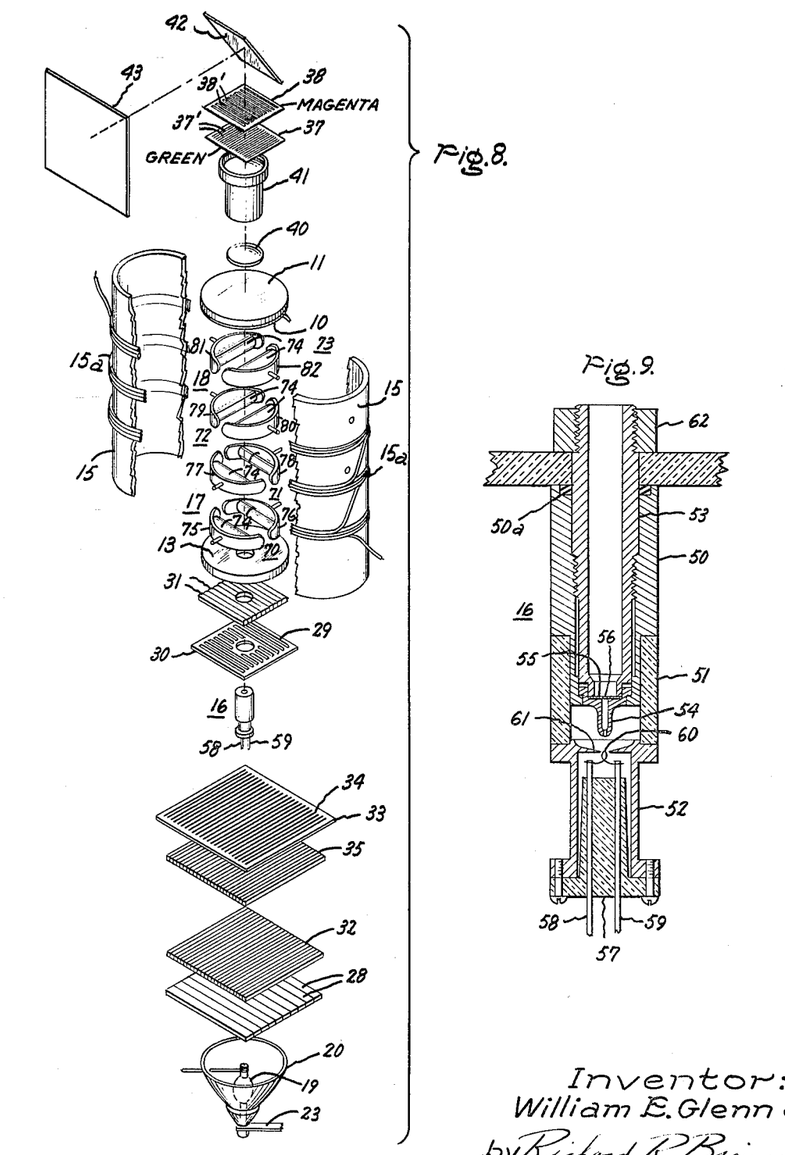
FIG. 8 is an elevational view showing the details of the electron gun structure.
FIG. 9 is an exploded isometric view of the operative components of the beam writing and optical projection system showing their functional arrangement.

As illustrated in FIG. 9, the electron beam generating apparatus includes the electron gun 16 supported from the transparent end wall 13 of the enclosure 12. The gun assembly includes an outer or anode supporting cylinder 50 bonded at its lower end to a ceramic cylinder 51, to the other end of which is bonded a generally cylindrical grid terminal member 52. The anode proper is in the form of a metallic cylinder 53 threadingly engaging the inner surface of the supporting cylinder 50 and terminating at its lower end in an apertured smaller diameter portion 54. Spaced from the lower end of the anode is an aperture plate 55 having a small rectangular beam defining aperture 56 therein. The lower end of the grid terminal 52 is closed by an insulator 57, generally T-shaped in elevational cross-section, which is secured in vacuum tight relation to the lower end of the grid terminal 52 by mechanically forcing it against a sealing ring (not shown). The insulator 57 is provided with lead-in conductors 58 and 59 which support a fine hairpin tungsten filament 60 which provides a source of electrons in alignment with the small aperture in the end 54 of the anode. The grid terminal is provided near its upper end with inwardly directed circular flange 61 which is tapered to a thin edge to define a grid aperture between the filament and the anode. The whole assembly is secured in vacuum tight relationship to the end wall 13 by means of a nut 62 threadingly engaging the anode 53 and the upper surface of the end wall 13. A suitable sealing ring 50a is received in an annular recess in the enclosing cylinder 50.

Figure 10:
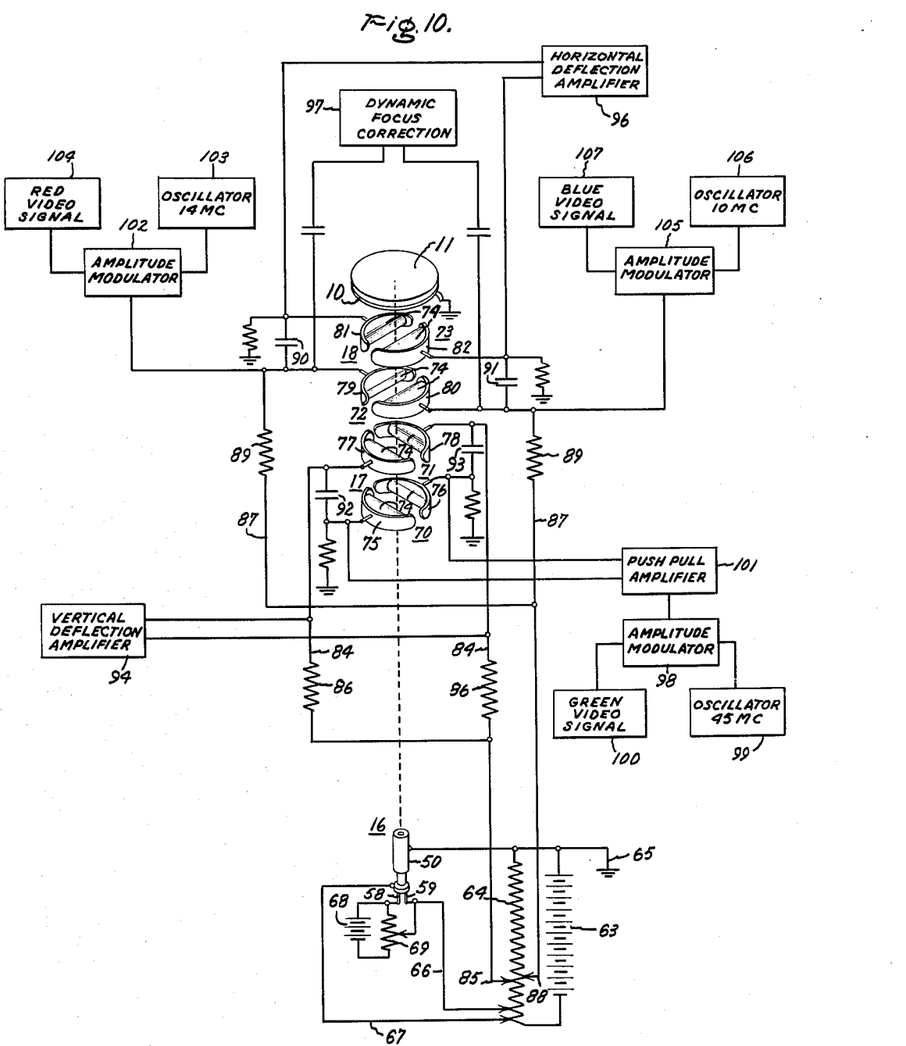
FIG. 10 is a schematic representation of the electron beam writing system of the present invention showing the energizing system for the various electrodes.

The illustrated embodiment of the system for the generation and control of the electron beam for writing color information in the form of orthogonally arranged diffraction patterns on the modulating medium 10 will now be described. The beam is generated in the electron gun by applying direct current potentials to the various electrodes described in detail in connection with FIG. 9. As illustrated in FIG. 10, a high voltage direct current source is illustrated schematically as a battery 63 shunted by a high resistance element 64 to provide various levels of direct current voltage. The positive terminal of the supply 63 is shown grounded at 65 and this terminal is also connected to the anode terminal 50. The cathode is maintained at a high negative voltage, for example, in the order of 7.5 kilovolts by conductor 66 connected between the resistor 64 and the cathode lead-in conductor 59. The grid is maintained at a negative voltage with respect to the cathode, for example, in the order of 200 volts by conductor 67. The filament is heated to a temperature of copious electron emission by means of a direct current source illustrated schematically as the battery 68 having a resistor 69 connected thereacross, spaced points of which are connected to the cathode lead-in conductors 58 and 59. The beam generated by this electron gun system is directed toward the modulating medium 10 on the opposite end wall 11. The beam is focused and deflected in both the horizontal and vertical direction during its travel from the electron gun to the modulating medium 10 by the vertical and horizontal deflection and focusing electrode assemblies 17 and 18, respectively. These assemblies include four pairs of opposed electrodes 70–73, inclusive, of similar construction and each including a lens and deflecting electrode 74 having a generally cylindrical surface facing the beam path and shaped on the opposite side to the contour of the inner wall of the cylindrical enclosure member 15 (FIG. 1) and bonded to a corresponding terminal 75–82 which are secured as by bonding to the inner wall of enclosure 15. Also, as clearly indicated in FIG. 1, the cylindrical electrodes of set 70 (the set nearest the electron gun) are slightly smaller and as a result spaced by a greater distance on opposite sides of the beam path than in the corresponding electrodes of the set 71. In a similar manner, the electrodes of the horizontal focus and deflection assemblies are slightly different in size with the more widely spaced electrodes being in set 72 located nearer the gun end of the system. The electrodes of set 72 have substantially the same lateral spacing as those of set 71. The focusing action of the electrodes is determined essentially by their direct current voltage which, as illustrated, is established by the connections with resistor 64 connected across the direct current supply 63. The terminals 75 and 76 and 81 and 82 are maintained at a slightly negative voltage with respect to ground by connecting them to ground through resistors 83 which are of large ohmic value, e.g., of the order of 100,000 ohms. The direct current voltage of the second pair of cylindrical electrodes and associated terminals 77 and 78 of the vertical focus and deflection system 17 is established by conductor 84 which connect terminals 77 and 78 with the tap 85 on resistor 64 through resistors 86 which are very large, e.g., 5 megohms, and serve the purpose of isolating the direct current supply from the deflection and color information containing voltages. This maintains the electrode at an appropriate voltage in the order of 5 or 6 kilovolts negative with respect to ground. In a similar manner, the terminals 79 and 80 are connected to a similar but independently adjustable voltage of 5 or 6 kilovolts negative with respect to ground by conductors 87 and tap 88 through isolating resistors 89. Capacitors 90, 91, 92 and 93 serve to connect together corresponding electrodes of the vertical and horizontal systems, respectively, with respect to the deflection and color signal voltages and to isolate them with respect to direct current voltages. The focusing electrodes serve to focus the electron beam in rectangular cross-section on the modulating medium 10 with dimensions, for example, of about 0.001″ and 0.005″ in the vertical and horizontal directions, respectively. These same electrodes are also utilized to control the vertical and horizontal deflection of the beam to scan a rectangular raster area (e.g., about 0.9″ by 1.2″ in vertical and horizontal dimensions, respectively) and also to modulate the beam to establish the diffraction gratings in accordance with the intensity of the various color components. The vertical deflection voltage from a source illustrated schematically at 94 is applied directly to the terminals 77 and 78 and through capacitors 92 and 93 to terminals 75 and 76 and is effective to deflect the beam over the height of the raster at the ordinary television field rate which is one-sixtieth of a second.

In a similar manner, the horizontal deflection voltages for scanning the beam horizontally of the raster area is applied directly to the terminals 79 and 80 and through capacitors 90 and 91 to terminals 81 and 82 by the output of a horizontal deflection voltage source illustrated schematically at 96. Also applied to terminals 79 and 80 only is a dynamic focus correction voltage from a source illustrated schematically at 97. This voltage is applied to terminals 79 and 80 through capacitors 97′ which are relatively small compared to capacitors 90 and 91 or in other words present a relatively large impedance as compared with the impedance presented by capacitors 90 and 91. With these impedances and a horizontal deflection circuit with a still lower impedance, the focus correction voltage is essentially limited to terminals 79 and 80 while the deflection voltage is applied to both sets of terminals 79, 80 and 81, 82. A similar dynamic focus correction may be applied in the vertical deflection system, if desired.

The deformations of the modulating medium 10 in accordance with the color information contained in color video signals are produced by superimposing on the deflection electrode circuits, voltages containing this color information which vary the charge density applied to the modulating medium and as a result the deformations thereof in accordance with this color information. As shown in the drawing, the vertical deflection circuit is modified by information corresponding to the green color content of the image to be projected. The beam is deflected or wobbled in a vertical direction at a high frequency and by an amount which is inversely proportional to the green color content of the picture, i.e., the amplitude of the wobble is a maximum when the green content of the picture is a minimum. This smears the charge over a greater area and decreases the charge density and the amplitude of the resulting deformation. As shown in the drawing, this control of the electron beam in a vertical direction is produced by an amplitude modulator shown schematically at 98 which modulates the output of an oscillator 99 in accordance with the amplitude of the green video signal source represented at 100. The output of the modulator is supplied to a push-pull amplifier 101, the outputs of which are connected to the terminals 75 and 76 and through capacitors 92 and 93 to terminals 77 and 78. The green video signal is an inverted signal, i.e., it has a minimum amplitude when the green color content is the maximum and vice versa. The frequency of the oscillator 101 may be, for example, in the order of 45 megacycles. The excursions of the beam at this frequency are so closely spaced that they are not resolved by the optical system and the effect of the wobble of the beam is to produce lines of charge in the direction of the horizontal scan which vary in charge density and therefore result in a deformation of the modulating medium which is proportional to the green color content of the picture to be projected.

The horizontal deflection is modified by both the blue and red video information to provide superimposed sets of diffraction gratings which cause diffraction of the light in the horizontal direction. The establishment of these diffraction patterns in accordance with blue and red color content is effected by circuits somewhat similar to those described in connection with the green signal information. As shown schematically in the drawing, an amplitude modulator 102 is provided for modulating the output of an oscillator 103 in accordance with the amplitude of the red video signal provided by source 104. The output of the modulator is applied directly to terminal 79 of one of the horizontal deflection electrodes. In a similar manner, blue video signal information is impressed on the terminal 80 by a circuit including amplitude modulator 105 which modulates the output of an oscillator 106 in accordance with the blue video signal information supplied by source 107. These color information containing voltages superimposed on the horizontal deflection voltage velocity modulate the horizontal sweep and cause periods of relative dwell of the electron beam which are spaced in accordance with the frequency of the oscillators 103 and 106 and which reduce the velocity of the sweep by amounts dependent upon the amplitude of the red video signal and the blue video signal. Since the greater the reduction in velocity of the sweep, the greater the charge density at that location and the greater the deformation of the medium, it is apparent that the red and blue video signal should be directly related to the blue and red, respectively, rather than inversely related as in connection with the green video signals. The resultant superimposed diffraction gratings are similar, for example, to the superimposed diffraction gratings provided for the three colors in my aforementioned Patent 2,813,146.

From the above description of the electron beam writing system in connection with FIG. 10, it is apparent that the raster area contains deformations extending generally along the raster line and having a spacing equal to the raster lines spacing and a depth dependent upon the amplitude of the green color content. These deformations are effective to diffract light or deviate the light in a vertical direction, i. e., generally along the green filter strips. Also, from the above description, it is apparent that the red and blue color information corresponding to the red and blue video signal information is impressed on the medium in the form of deformations having a spacing dependent upon the particular color component (determined by the frequency of the oscillator which is amplitude modulated by the color signal) and an amplitude dependent upon the amplitude of the particular color signal. These deformations extend generally in a vertical direction and are effective to diffract or deviate the light in a horizontal direction generally along the magenta strips 38 of the color filter. Referring particularly to FIG. 8 which, although somewhat expanded in an axial direction, shows the functional relationship of the various parts of the optical system, and as previously described in connection with FIG. 1, the input optics are effective to illuminate the entire raster area and only that area and to image the light source in the vertical slots 34 and the horizontal slots 29. The horizontal cylindrical lenticular members 28 image the source 19 in the horizontally extending slots 29 and in a similar manner the vertically extending cylindrical lenticular lenses image the source 19 in the vertically extending slots 34. Lenticular lenses 35 associated with the slots 34 image the vertically extending lenticular lenses 32 on the raster area of the modulating medium 10 so that the image of each lens fills the full horizontal dimension of the raster area. In a similar manner, the cylindrical lenticular lenses 32 image the cylindrical lens members 28 on the raster area of the modulating medium 10 so that the image of each lens member 28 fills the full vertical dimension of the raster area. In this way the raster area is uniformly illuminated and all of the light is imaged in the vertical and horizontal slots of the input masks (34 and 29) so only the small amount of light intercepted by the bars of the input masks 30 and 33 is not transmitted. This provides for maximum utility of the light source and uniform illumination of the raster area.

The output optics including the lens 40, which may be termed the schlieren lens, and the projection lens 41 are, in the absence of deformations of the medium 10, effective to image light passing through the slots 29 on the magenta strips 38 and to image the light passing through the slots 34 on the green filter strips 37'. Actually the light passing both of these sets of slits are in the form of rectangular areas corresponding to the over-lapping areas of these slits and these areas are imaged on the overlapping areas (projected) of the green and magenta filter strips 37' and 38'. These overlying areas are opaque and are effective to block the passage of light when the medium 10 is undeformed. When the medium is deformed in response to the presence of green color information by ridges in the direction of the raster line, light is diffracted along the green filter strip to the area of these strips between the magenta strips and passes through to project green light having an intensity dependent upon the magnitude of the deformations in the medium. As shown in FIG. 8, this light is imaged on the mirror 42 and reflected to the viewing screen 43. In a similar manner, in response to the vertically extending deformations in medium 10 which are spaced in accordance with the blue and red color signals and have amplitudes dependent upon the amplitude of those signals, light is diffracted along the magenta strips to pass through the magenta strips color corresponding to those deformations. When both green and either red or blue or combinations thereof are present, light may pass through the green areas, the magenta areas, and the transparent areas provided by the filter masks.

Inasmuch as only green light passes through the green filter, it is not necessary that the masking system and diffraction gratings for green light operate as a color selecting system but only that the intensity of the light passing through the green filter areas be controlled in accordance with the intensity of the green color content. Accordingly, this system can be relatively open or widely spaced and this is true in the instant embodiment in which the magenta strips which correspond to the light passage areas for the green light are greater than those in the orthogonal direction where color selection does take place. The manner in which orthogonal patterns of diffraction and the orthogonally arranged filter strips operate to project the color image is described in detail and broadly claimed in my aforementioned copending application Serial No. 49,746, filed August 15, 1960.

Referring now to FIG. 1 of the dawing, some of the considerations involved in the positioning and dimensioning of the optical components of the system will be described. As illustrated, the input lenticular cylindrical lenses 28 and 32 are located in essentially the same plane near the light source. The focal length of these lenses is determined respectively by the diffraction angle of the orthogonally arranged deformations in the medium. The lenses 28 are related to the raster line spacing, the spacing between the horizontal ridges formed in accordance with the green color information while the lenses 32 are related to the deformations extending in the vertical direction and corresponding to the blue and red gratings which have the spacings determined by the raster dimension and the frequencies of the oscillators which have been indicated for a particular embodiment as 14 and 10 megacycles, respectively. Since these lenses 28 and 32 are located in essentially the same plane, they serve to image the light source at substantially different distances from that plane and this establishes the position of the input masks 33 and 30. The distance of the medium from these two masks and associated lenses 31 and 35 is likewise established. Since the lenses 33 and 35 are in different planes, the output filter masks 37 and 38 are in different planes. It will be understood by those skilled in the art that it is possible to place the lenses 32 and 28 of the input lens systems in different planes so that the input light masks 30 and 33 and associated lenses are in essentially the same plane in which case the output filter masks 37 and 38 will also lie in essentially the same plane. The embodiment illustrated is preferred and has as an advantage, the freedom which it gives to adjust one output filter mask independently of the other. The dependence of the number of the bars, slots and lenses and their dimensions on the parameters discussed above follows from the well known diffraction equation $$d_1 = \frac{l\lambda}{s}$$

where $d_1$ is the distance between the zero order and first order light of wavelengths, $\lambda$ measured in a plane a distance $l$ from the light modulating of diffracting medium having a grating wavelength or spacing $s$. This equation is valid for small angles of diffraction and establishes essentially the center line of the bar to the center line of the slot distance for a system in which only first order diffraction is passed by the bar and slot system and in which light is passed through the slot adjacent the bar on which the zero order falls. In such a system the width of the slot and the width of the bar may be essentially equal with the exact dimensions depending upon a balance between color purity, resolution and light passed. The above discussion is phrased in terms of an output bar and slot system but applies equally well to an input bar and slot system.

Certain advantages are obtained by departing from the relationship discussed above. This departure is accomplished in the mask and filter strips by designing the system to pass the first order red diffracted light not through the slot adjacent the bar on which the zero order passes, but rather through the second slot from that bar. The first order blue diffracted light, however, is passed through the slot adjacent the one on which the zero order is intercepted and the unwanted first order diffracted light is intercepted by the bar between the first and second slots. It is apparent that these considerations are correlated with the frequencies selected for the modulators 106 and 103 for the blue and red oscillators which determine the spacing of the blue and red gratings of the modulating medium. Features of the light valve projection system involving this correlation of the grating wavelength and the frequencies of the light components with the light masking system so that the first order diffracted light of one color component passes through the second space out from the opaque area obstructing the undeviated light while the first order diffracted light of the other color component is passed through the first space out from the opaque area blocking the undiffracted light is described and claimed in my copending application Serial No. 320,912, filed November 1, 1963, for Colored Light Projection System, which application is a continuation-in-part of my abandoned application Serial No. 49,746, filed August 15, 1960.

In the horizontal light mask 30 the slots are substantially wider than the bars and substantially wider than they would be if designed in accordance with the above considerations. The actual spacings are obtained by closing every other slot by connecting adjacent bars so that the ratio of the bar width to the slot width is approximately 3:1. This is possible since as appears from the foregoing description, color selection is not required in the vertical direction, i.e., the direction which controls the green color content of the projected image. This opening up of this mask by the widened slots increases the amount of light available for reproducing magenta by reducing the light which would otherwise be intercepted by the bars of the horizontal or green input mask. The output filters are complements of the input mask i.e., the magenta strips which block the zero order of light through the horizontal slots 29 are accordingly substantially wider than the transparent spaces therebetween.

While the present invention has been described in connection with a liquid light modulating medium from which the information is projected simultaneously with the writing, it is to be understood that many features of the invention are equally applicable to a system in which a tape such as a thermoplastic tape is permanently deformed in accordance with an electron charge pattern established thereon by the beam and that the optical projecting system may be utilized with slight modification to project such information either simultaneously with the writing or at a later time. It will be appreciated that if the system is used with a tape which is moved in one of the orthogonal directions, for example, in the vertical direction, the movement of the tape provides for the relative movement between the beam and the recording medium and it is not necessary, therefore, in such a system that the beam be vertically deflected other than the high frequency wobble for varying the charge density of the beam which in the specific embodiment illustrated is in accordance with the green color content. In such an arrangement one of the two pairs of cylindrical lenses, the electrodes of the vertical focusing and deflection system, may be eliminated and the focusing voltage and voltage for wobbling the beam be impressed on a single pair of electrodes. In other respects, the beam writing and optical system may be as described and illustrated. It is also apparent that the optical system, while having particular advantages in connection with the particular electron beam control system and the coaxial arrangement therewith, has features and advantages with respect to the efficiency of use of the input light independently of the electron beam system.

While the total advantages of the present invention are best utilized in connection with a color image projection and electron beam writing system utilizing orthogonal diffraction gratings and orothogonal lens and mask systems, it is to be understood that many features of the invention may be utilized in other systems such as black and white television or other information systems whether or not orthogonal diffraction gratings and optical systems are employed. Also, the entire light masking system may be of transparent and opaque character rather than of the color filter type described and illustrated in connection with the light output portion of the system. In the preceding description the words "bars" and "slots" have been used to describe the light masks and it should be understood that the word "slot" is used to imply areas of transparent material as well as to open spaces.

While I have described and illustrated a particular embodiment of my invention, it will be apparent to those skilled in the art that many changes and modifications may be made without departing from my invention in its broader aspects and I aim, therefore, in the appended claims to cover all such changes and modifications as fall within the true spirit and scope of my invention.

What I claim as new and desire to secure by Letters Patent of the United States is:

1. An optical projection system for projecting an image in accordance with the information contained in orthogonally oriented light deviating deformations in a light modulation medium comprising means providing a source of light, a light masking system interposed between said source and the modulating medium including means defining two sets of bars and slots extending respectively in the directions of the deformations in the medium, a pair of cylindrical lenticular lens systems interposed between the light source and said light masking system and each lens system including a plurality of cylindrical lenticular lenses arranged in side by side relation and corresponding in number to the number of slots in said light masking system and extending in the same direction as the corresponding slots of said light masking system for imaging said source of light in said slots and a second pair of lenticular lens systems and each including a plurality of cylindrical lenticular lenses arranged in side by side relation with the lenses of each pair of lens systems associated respectively with one set of said orthogonally extending slots of said light masking system for imaging the lenses of said first-mentioned pair of lenticular lens systems on a raster area of the modulating medium so that the lenses of said first-mentioned pair of lens systems is imaged to the full dimension of the raster area in a direction transverse to the length of said lenses and output light masking means for blocking light impinging on the light modulating medium and undeviated in direction thereby and passing light undeviated in direction in accordance with the information contained in the deformed modulating medium.

2. An optical system for projecting light from a source of light to an image area in accordance with deviation of the light produced by a light modulating medium comprising a light mask including a plurality of bars and slots inperposed between said light source and said modulating medium, an array of parallel arranged cylindrical lenticular lenses interposed between said light source and said light mask for imaging said source in said slot and a second array of parallel cylindrical lenticular lenses interposed between said first array of lenses and said medium for imaging each lense of said first array over the full raster dimension of said medium in a direction transverse to the length of the lense of said first array of lenses and masking means interposed between said medium and an image area for blocking undeviated light emanating from said medium and selectively passing light emanating from said medium in accordance with the deviation thereof produced by the medium.

3. An optical system for projecting light from a source of light to an image area in accordance with deviation in direction of the light produced by a light modulating medium comprising a light mask including any array of alternately opaque and light transmitting areas interposed between said light source and said modulating medium, an array of lenses interposed between said light source and said light mask for imaging said source in said light transmitting areas and a second array of lenses interposed between said first array of lenses and said medium for imaging each lens of said first array on the area of said medium containing the information to be projected and masking means interposed between said medium and the image area for blocking light emanating from said medium thereby and undeviated in direction thereby and selectively passing light emanating from said medium in accordance with the deviation in direction thereof produced by said medium.

4. An electron beam focusing and deflection system for focusing the beam in orthogonal directions and deflecting the beam in at least one of those directions comprising three sets of electrodes spaced along the beam path with each set including a pair of elongated electrodes spaced from the beam path on opposite sides thereof and presenting a generally cylindrical surface toward the beam path, two of said sets of electrodes extending in one direction and transversely of said beam and one of said sets of electrodes extending at right angles thereto and transversely of said beam, means for energizing said last-mentioned set of electrodes and one of the first two sets of electrodes with voltages substantially negative with respect to the beam voltage to focus the beam in orthogonal directions and means for impressing a deflection voltage on the electrodes of said one of said first two sets of electrodes.

5. An electron beam system for producing a charge pattern on a light modulating medium over a scanned area thereof representative of two types of information comprising an electron gun for producing and accelerating an electron beam towards that medium and means for focusing and controlling the deflection of said beam comprising four sets of electrodes each including two electrode members extending transversely of the beam path on opposite sides thereof and presenting a generally cylindrical surface toward the beam path, the electrodes of two sets of said electrodes extending in a direction generally parallel to one dimension of the scanned area of said modulating medium and the electrodes of the other two pairs extending generally parallel to the other dimension of the scanned area of said modulating medium, means for impressing voltages on one pair of electrodes extending in each of said two directions which are substantially negative with respect to the beam voltage in the corresponding position to focus the beam in a corresponding direction, means for impressing a deflection voltage on at least one set of electrodes to scan the beam in the corresponding direction and means for impressing a voltage on said one set of electrodes to modulate the beam in accordance with information to be impressed on the modulating medium.

6. A concentric electron beam writing and optical projection system comprising a vacuum enclosure having transparent end walls, a light modulating medium within said enclosure, an electron gun for producing and accelerating an electron beam toward said light modulating medium, crossed cylindrical focusing and deflecting electrodes positioned on opposite sides of the path of said beam between said gun and the medium, means subjecting said beam to control voltages to establish a pattern of light deviating changes in said medium, a light source for projecting light concentrically with said electron beam and within said focusing and deflecting electrodes to impinge on said medium over the area scanned by said beam and light projection means for projecting light only in accordance with deviation in the light path produced by said medium including light masking means and associated cylindrical lenticular lenses.

7. A concentric electron beam writing and optical projection system comprising a vacuum enclosure having transparent end walls, a light modulating medium within said enclosure adjacent one of said end walls, an electron gun supported from the opposite end wall for producing and accelerating an electron beam toward said light modulating medium, two sets of cylindrical focusing and deflecting electrodes positioned on opposite sides of the path of said beam between said gun and the medium, said sets of electrodes extending orthogonally with respect to each other and with respect to said path, means energizing said electrodes to subject said beam to control voltages to establish a pattern of light deviating changes in said medium in accordance with an image to be projected, a light source for projecting light through said end walls concentrically with said electron beam and within said focusing and deflecting electrodes to impinge on said medium over the area scanned by said beam and light projection means for projecting light only in accordance with the light deviations in the light path produced by said medium including two orthogonally extending bar and slot systems and two sets of cylindrical lenticular lenses cooperating therewith, one of said bar and slot systems and one of said lens systems extending in a direction parallel one of said sets of cylindrical focusing and deflecting electrodes.

8. An electron beam and optical projection system for producing a projected optical image of information contained in an electron beam comprising an elongated evacuated envelope having a transparent end wall closing one end of said envelope, a light modulating medium within said envelope adjacent said end wall, an end wall assembly including a transparent end wall and a source of electrons supported centrally thereof for directing an electron beam toward said light modulating medium, means for accelerating and controlling the electron beam to establish a charge pattern over an area of said light modulating medium, said end wall assembly also including a lenticular lens system and a light masking system including a plurality of alternately arranged opaque and light transmitting areas, a light source and a second lenticular lens system interposed between said light source and said end wall assembly for imaging said light source in said light transmitting areas, said first-mentioned lenticular lens system imaging said second lenticular lens system on said area of said light modulating medium.

9. An electron beam and optical projection system for producing a projected optical image of information contained in a controlled electron beam comprising an elongated evacuated envelope having transparent end walls to provide a light path therethrough, a light modulating medium within said envelope adjacent one of said walls and presenting a substantial area transverse to the length of said envelope, a source of electrons for directing an electron beam toward said light modulating medium, means for accelerating and controlling the electron beam to establish a charge pattern over an area of said light modulating medium, a first lenticular lens system and a cooperating light masking system including a plurality of alternately arranged opaque and light transmitting areas closely associated therewith, a light source and a second lenticular lens system interposed between said light source and said first lenticular lens system for imaging said light source in said light transmitting areas, said first-mentioned lenticular lens system imaging said second lenticular lens system on the area of said light modulating medium.

10. An optical system for projecting light from a source of light to an image area in accordance with two components of information represented respectively by orthogonally arranged patterns of light deviating deformations of a light modulating medium comprising a light source, light masking means interposed between said light source and said medium including two sets of elongated light transmitting areas separated by elongated opaque areas, a lenticular lens system between said source and said masks for imaging said source in said light transmitting areas and a second lenticular lens system closely associated with said light transmitting areas of said light masking means for imaging said first lenticular lens system on an area of said light modulating medium and light masking means interposed between said light modulating medium and said image area for passing light to said image area only when the light is deviated in accordance with light deviating patterns of deformations in said medium.

11. An optical system for projecting light from a source of light to an image area in accordance with two components of information represented respectively by orthogonally extending patterns of light deviating deformations of a light modulating medium comprising a light source, light masking means interposed between said light source and said medium including two sets of orthogonally extending elongated light transmitting areas separated by elongated opaque areas, a lenticular lens system having curvatures in orthogonal directions located between said source and said masks for imaging said source in said light transmitting areas and a second lenticular lens system closely associated with said light transmitting areas of said masks for imaging said first lenticular lens system on an area of said light modulating medium and light masking means including orthogonally extending sets of spaced light transmitting areas interposed between said light modulating medium and said image area for passing light to said image area only when the light is deviated in accordance with the deformations in said medium.

References Cited by the Examiner

UNITED STATES PATENTS

| | | | |
|---|---|---|---|
| 2,233,887 | 3/41 | Farnsworth | 178—7.85 |
| 2,538,852 | 1/51 | Szegho | 178—7.85 |
| 2,892,380 | 6/59 | Baumann et al. | 88—61 |
| 2,896,507 | 7/59 | Mast et al. | 88—61 |

FOREIGN PATENTS 513,739  10/39  Great Britain.

DAVID G. REDINBAUGH, *Primary Examiner.*

ROBERT SEGAL, *Examiner.*